L. R. JONES.
ZINC ELECTRODE FOR GRAVITY BATTERIES.
APPLICATION FILED JULY 21, 1916.

1,199,558. Patented Sept. 26, 1916.

UNITED STATES PATENT OFFICE.

LLEWELLYN R. JONES, OF CAMDEN, NEW JERSEY.

ZINC ELECTRODE FOR GRAVITY-BATTERIES.

1,199,558.　　Specification of Letters Patent.　Patented Sept. 26, 1916.

Application filed July 21, 1916. Serial No. 110,433.

*To all whom it may concern:*

Be it known that I, LLEWELLYN R. JONES, a citizen of the United States of America, and a resident of Camden, in the county of Camden and State of New Jersey, have invented a certain new and useful Improvement in Zinc Electrodes for Gravity-Batteries, of which the following is a true and exact description, reference being had to the accompanying drawings, which form a part thereof.

My present invention relates to galvanic batteries of the gravity type and has for its general object the provision of an improved zinc electrode for this type of battery.

More specific objects of my invention are to provide a zinc electrode for a gravity battery which will permit all the zinc of the electrode to be effectively utilized and consumed in the battery, and in which the zinc will present a relatively large surface area for chemical action and at the same time will be free from liability of having portions break off and fall to the bottom of the cell as the zinc wastes away in the use of the battery.

A further object of the invention is to provide a zinc electrode construction which possesses a desirable mechanical strength and stability while at the same time permitting a ready renewal and an easy and accurate adjustment of the active portion of the electrode without the use of tools.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Figure 1:
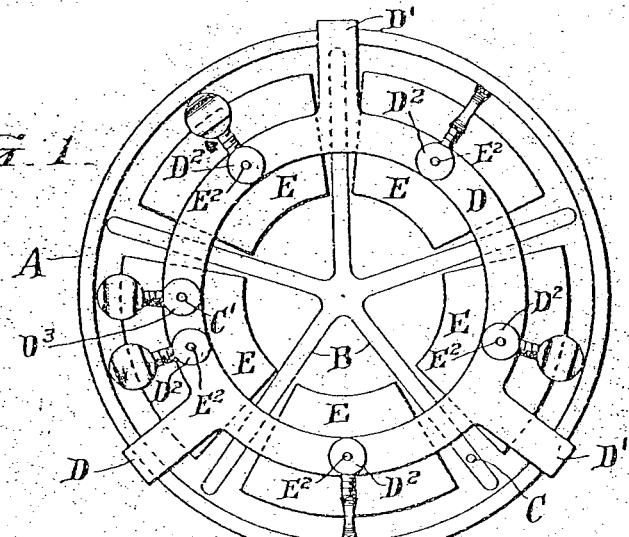
Figure 2:
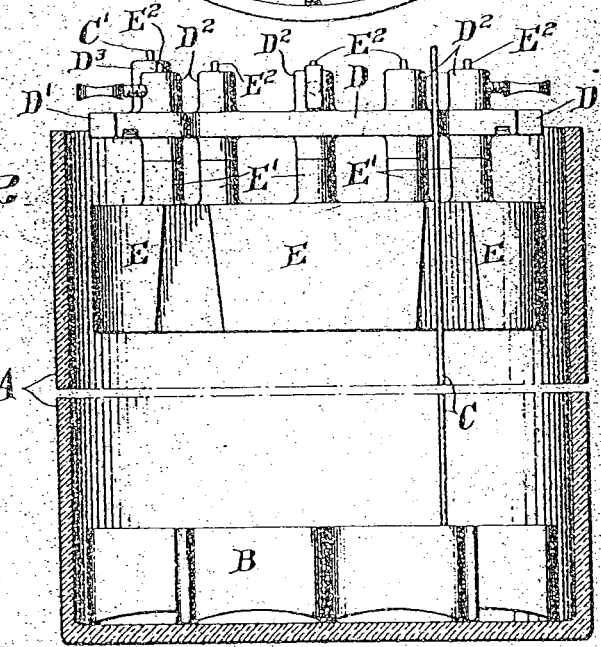

Of the drawings: Figure 1 is a plan view of a gravity cell in which my improved electrode is utilized; Fig. 2 is a side elevation with the battery jar in section; and Fig. 3 is an elevation of the different sections of one of my improved battery zincs as it appears after being put into use.

In the drawings, A represents the containing jar of a gravity cell, B the copper electrode at the bottom of the jar, and C the line conductor leading away from the electrode B. Mounted on the top of the jar is a spider or frame member D preferably formed of copper or brass. As shown, the member D comprises a ring like body portion somewhat smaller in diameter than the internal diameter of the jar A, and outwardly extending lugs or arms D' which rest on the upper edge of the jar. The zinc or active portion of the electrode is formed of sections E, there being five of these sections in the construction shown. Each of the sections E has embedded in it a copper or brass wire $E^2$ which forms a means for securing the electrode section to the frame member D. As shown, the wire part $E^2$ of each electrode section passes upward through a corresponding passage formed in the body or ring portion of the frame D and in a corresponding boss $D^2$ formed on the upper side of the frame member. Each boss $D^2$ is provided with a threaded socket for a clamping screw by which the inserted end of the wire part $E^2$ of an electrode section may be adjustably and detachably secured. Advantageously as shown, the member D is also provided with a hollow boss $D^3$ and with a clamping screw threaded in the latter for securing a line conductor C' to the member D.

In the preferred construction illustrated the sections E are generally similar in shape to the parts which would be formed by severing along radial planes an annulus the radial depth of which is approximately equal to its axial thickness. The sections E may well be formed, as shown, with small bosses on their upper sides surrounding the wires $E^2$. While the exact shape of the electrode sections E is not material, it is essential that these electrode sections should be compact and relatively massive bodies, as shown, rather than of pencil or plate like form. The compact and massive form of the sections practically prevents any possibility of a zinc electrode section separating, as it wastes away in use, into sections of which some are free from the supporting wire $E^2$, notwithstanding the ordinary non-uniformity of the zinc wastage due to soft spots and the like in the zinc. This makes it possible to permit each section to remain in use until entirely consumed. If all the different sections wasted away to nothing at the same time, the battery would then fail, of course, but with my construction it is practically possible to avoid this difficulty by so arranging that the different electrode sections will be entirely consumed at different periods. For example, in batteries used in railway signal work it is customary to inspect batteries at regular intervals of six weeks or so, and at each inspection to make the necessary renewals and adjustments. In using my improved zinc electrode for such work, the size of the sections and the time interval between the regular periods for inspection and renewal should be so related that the complete wasting away of an electrode section takes an appreciably greater time than that existing between successive inspection periods. In consequence, if initially, or at any subsequent inspection period, the electrode be composed of zinc sections of suitable unequal sizes, at the following inspection periods one or more, but not all of the zinc sections will normally be found to be completely wasted away provided that at each inspection period the completely wasted away sections are replaced by full sized sections. Should there be at any inspection period no completely wasted away section and no section large enough to insure against absolute or partial failure of the cell prior to the next regular inspection period, one or more of the larger partially wasted away sections may be temporarily withdrawn and full sized sections substituted therefor. At some subsequent inspection period such a temporarily withdrawn section may be put back into use.

Figure 3:
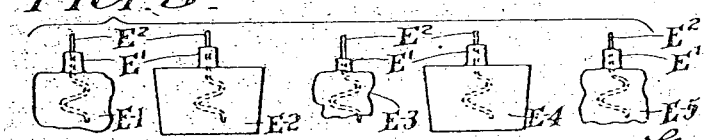

In Fig. 3 I have shown the sections of an electrode constructed in accordance with my invention as they may appear immediately after the inspection period in which the electrode sections $E^2$ and $E^4$ are in the full sized unwasted condition, electrode sections $E'$ and $E^5$ are approximately two-fifths consumed, while the electrode section $E^3$ is approximately two-thirds consumed. At each inspection period it is readily possible to lower the partially wasted electrode sections as may be desirable to thereafter subject the partially wasted sections to the wasting action of the battery fluid on their upper ends, as well as on their sides and lower ends, and thus insure the complete wastage away of the entire sections.

The subdivision of the electrode into a number of sections insures a desirably large electrode surface area subjected to the action of the battery fluid, while at the same time the compact form of the electrode sections and the means employed for supporting them insures a desirable mechanical strength and stability as well as ease of renewal and adjustment. The fact that the compact and massive form of the electrode sections makes it possible to have the supporting wires $E^2$ in approximately vertical alinement with the centers of gravity of the corresponding sections, adds to the mechanical strength and stability of the electrode structure and also lessens the liability of pieces of the electrode section breaking off and falling to the bottom of the cell in case of unusually non-uniform wastage of the sections. The compact form of the electrode sections and the ease with which they may be adjusted makes it a simple matter to keep these sections in the comparatively shallow zone of the battery fluid of a gravity cell in which the active portion of the zinc electrode should be located to insure its efficient consumption and the avoidance of internal short circuiting of the cell.

While in accordance with the provisions of the statutes I have illustrated and described the best form of my invention now known to me, it will be apparent to those skilled in the art that changes can be made in the form of my invention without departing from its spirit, and that some features of my invention can be used without a corresponding use of other features.

Having now described my invention, what I claim as new and desire to secure by Letters Patent, is:—

1. An electrode for a gravity cell comprising in combination a metallic support adapted to extend across the top of a battery jar and to be supported by the latter, and a plurality of compact relatively massive zinc bodies each having a supporting wire embedded therein and detachably and adjustably secured to said support.

2. An electrode for a gravity battery comprising in combination a plurality of compact and massive zinc bodies each having a supporting wire embedded therein and a skeletonized metallic frame member adapted to extend across the top of a battery jar and to be supported by the upper edge of the latter and formed with sockets to receive, and clamping screws for securing in said sockets the supporting wires of said zinc bodies.

LLEWELLYN R. JONES.